Jan. 14, 1969
J. H. C. HALLS
3,421,293
PAINT SPRAY BOOTHS
Filed April 19, 1967
Sheet 2 of 5
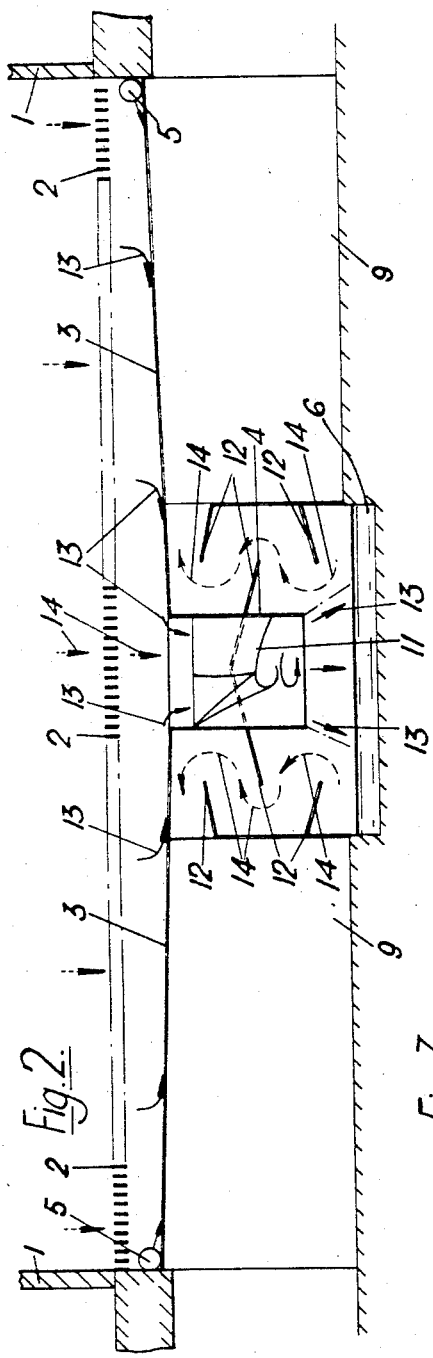
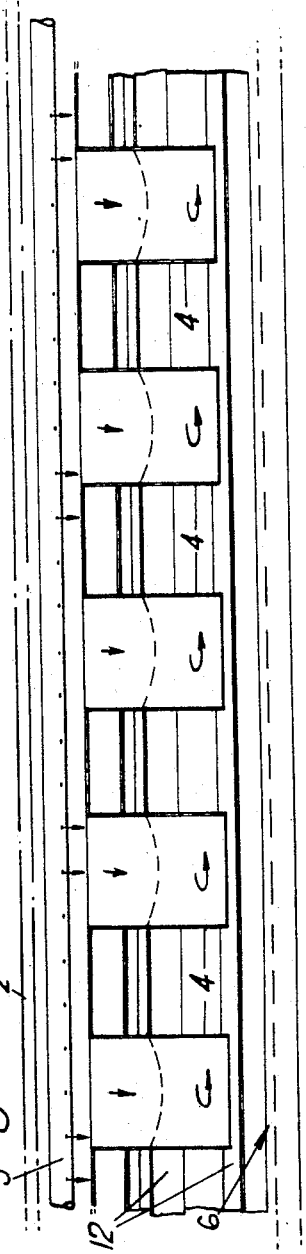
Inventor
J. H. C. HALLS
By McCoy, Greene and
Howell   Attorneys

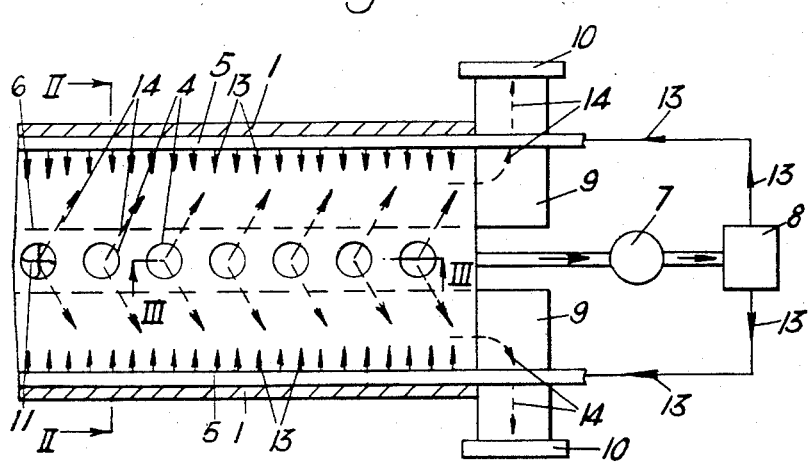

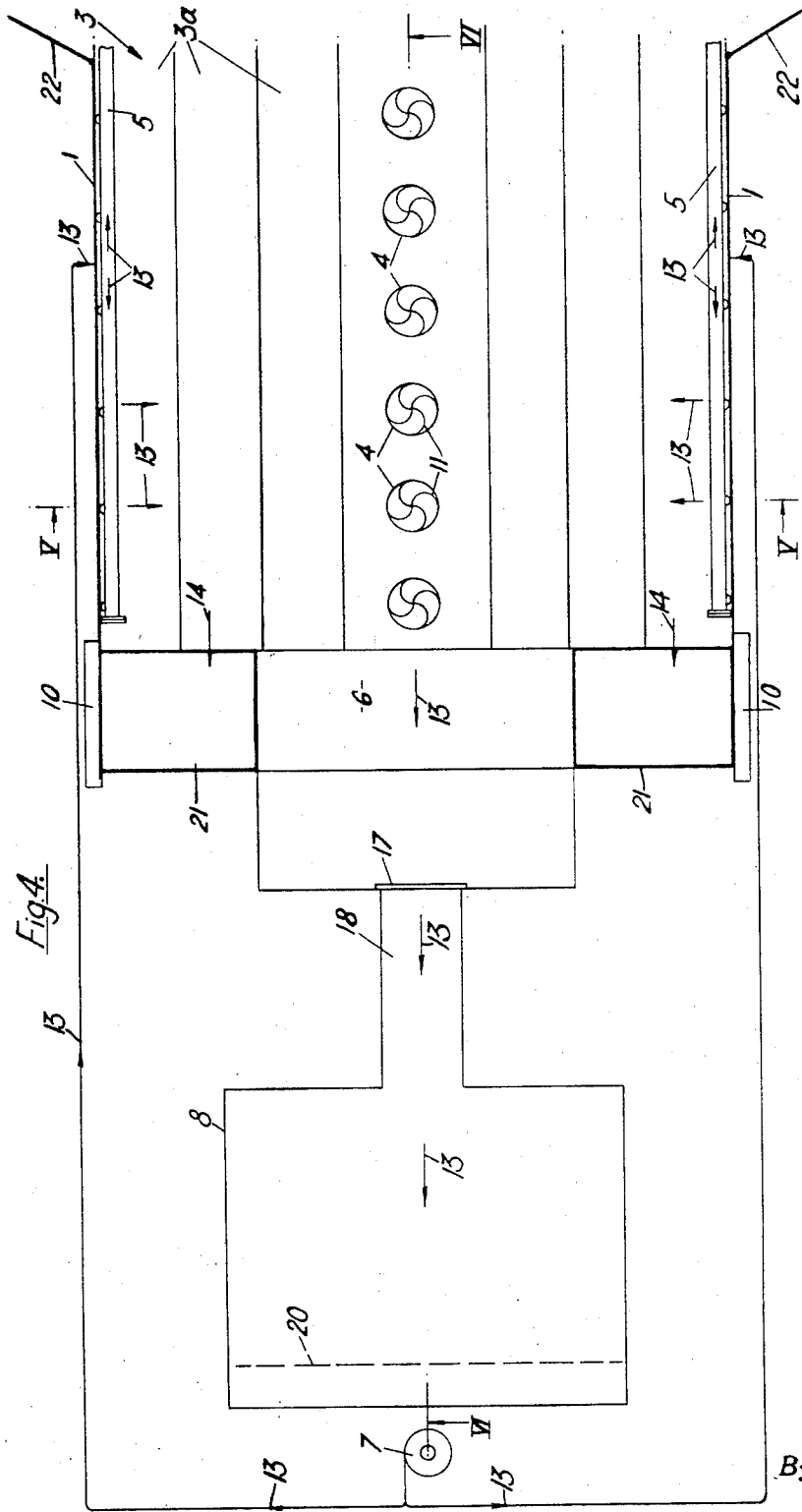

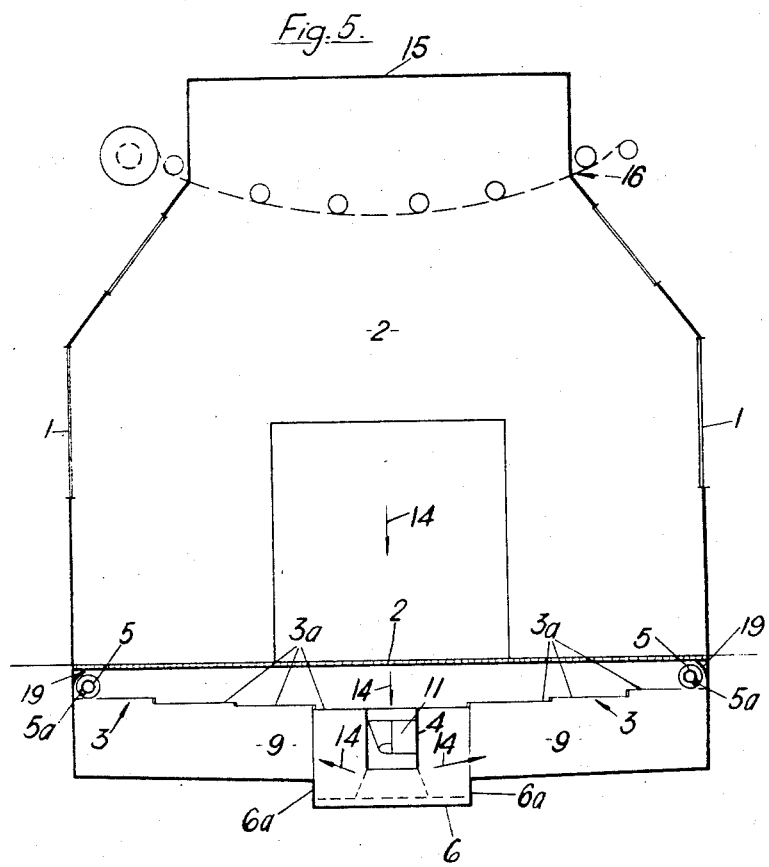

United States Patent Office 3,421,293
Patented Jan. 14, 1969

3,421,293
PAINT SPRAY BOOTHS
James Henry Collins Halls, Beckenham, England, assignor to Schweitzer Equipment Company, Cleveland, Ohio, a corporation of Ohio
Filed Apr. 19, 1967, Ser. No. 631,932
Claims priority, application Great Britain, Aug. 19, 1966, 37,314/66; Feb. 23, 1967, 8,646/67
U.S. Cl. 55—223                 7 Claims
Int. Cl. B01d 47/02; B01d 47/06

ABSTRACT OF THE DISCLOSURE

Paint is extracted from air in a paint spraying booth by drawing the paint-laden air through a tube or tubes extending downwardly from a guide plate located beneath a grille floor and over which water flows into the tube or tubes which latter are provided with vanes adapted to cause gyratory turbulence of the air and water and form the water into small droplets to which at least some of the said paint adheres. The air and droplets are exhausted into a trough beneath the tubes and are separated, the paint-laden water being directed to water-cleansing means which are included in a water-circulating system through which the water is continuously circulated.

BACKGROUND OF THE INVENTION

Field of the invention

The invention relates to booths in which paint is sprayed on articles to be coated and in particular is concerned with a method of and apparatus for extracting paint from air in the booths.

Description of the prior art

It is customary to extract air from a paint spraying booth and to wash it with water in order to remove paint entrained in the air and it is a main object of the present invention to provide a method of and apparatus for this purpose which is more economical, both as regards initial cost and cost of maintenance, and which utilizes less space, than equipment currently known for the purpose.

SUMMARY

According to one aspect of the invention there is provided an apparatus for extracting paint from air in a paint spraying booth by creating a water-circulating system which includes a tube, or a plurality of tubes spaced apart lengthwise of the booth, through which the water passes and extends, or extend, downwards from beneath the booth, water-cleansing means upstream of the tube or tubes, and a water-containing trough located beneath said tube or tubes and communicating with the water-cleansing means, extracting air from the booth through the tube or tubes and causing at least some of the paint entrained in the air to adhere to small droplets of water by creating in the tube or tubes a gyratory turbulence, and exhausting the air and droplets into said trough.

According to another aspect of the invention there is provided apparatus for extracting paint from air in a paint spraying booth, comprising a water-circulating system including one or more tubes spaced apart lengthwise of the booth and supported to extend downwards from beneath the booth, a subfloor in the form of a guide plate extending lengthwise of and across the booth to guide the flow of water into the upper end or ends of the tube or tubes, a trough to receive water issuing from the tube or tubes, water-cleansing means upstream of the tube or tubes, exhaust means operable to extract air from the booth through the tube or tubes, vanes located in the tube, or in each tube, and arranged to create in air and water passing downwardly therethrough a gyratory turbulence which forms the water into small droplets to which at least some of the paint entrained in the air adheres, and a water containing trough located beneath said tube or tubes and communicating with said water-cleansing means, said trough being arranged to receive air and droplets exhausted from the tube or tubes.

BRIEF DESCRIPTION OF THE DRAWINGS

FIG. 1 is a diagrammatic plan of a booth provided with apparatus according to the invention,
FIG. 2 is a section on line II—II, FIG. 1,
FIG. 3 is a section on line III—III, FIG. 1,
FIG. 4 is a diagrammatic plan, with the grille floor removed, of a part of a booth provided with a modified form of apparatus according to the invention,
FIG. 5 is a section on line V—V, FIG. 4.

In the drawings like reference numerals refer to like or similar parts.

DESCRIPTION OF THE PREFERRED EMBODIMENTS

Figure 6:
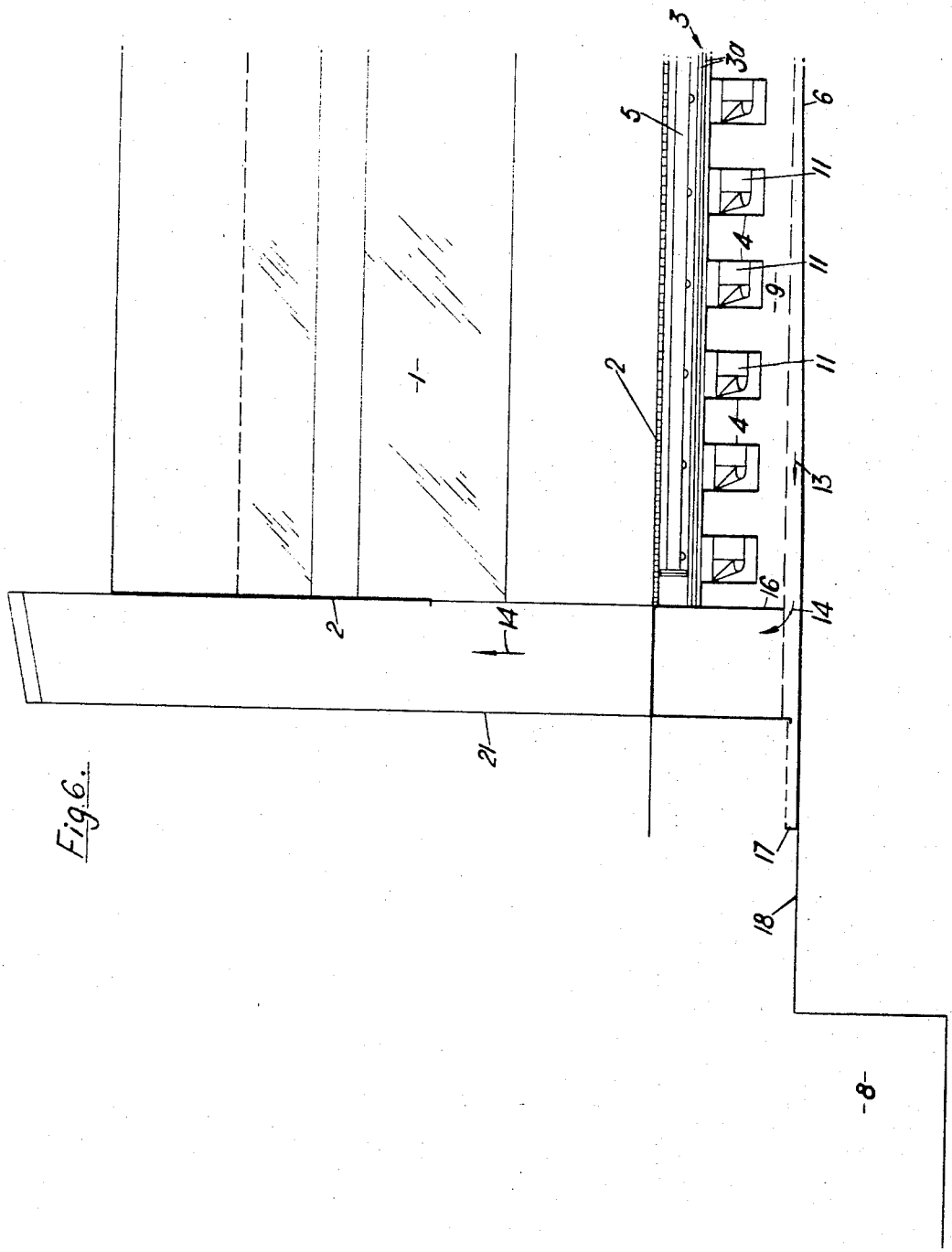
FIG. 6 is a section on line VI—VI, FIG. 4.

Referring to FIGS. 1 to 3 of the drawings, these illustrate an embodiment of the apparatus in which a conveyor, not shown, moves centrally along the length of a booth so that operators can stand on both sides of the path of articles to be painted. The paint-spraying booth includes side walls 1, and end walls and a roof not shown, and has a grille floor 2 FIGS. 2 and 3, on which operators stand during spray painting of articles, for example automobile bodies, which are moved into and out of the booth by a conveyor in known manner, not shown.

Beneath the grille floor 2 there is a guide plate 3, which constitutes a water-washed subfloor under the grille floor, and which extends lengthwise of the booth and slopes downwards, FIG. 2, from the opposite sides 1 of the booth towards the centre. Circular openings in the middle of the guide plate 3 are spaced apart lengthwise of the booth and communicate with tubes 4 which are supported to extend downwards from beneath the booth. The guide plate 3 and tubes 4 form part of a water-circulating system the water in which is chemically treated in known manner to assist the adherence of paint particles to the water droplets and the subsequent cleansing of the water. The said system includes pipes 5 located on the top of the guide plate, a trough 6 which extends lengthwise of the booth and into which the tubes 4 depend, a circulating pump 7, FIG. 1, and water-cleansing means 8, of any suitable known kind. Upright side walls 23 extend along the length of the water trough on opposite sides thereof.

The trough 6 communicates with air exhaust ducts 9 which also extend lengthwise of the booth and which are located beneath the guide plate 3. The ducts at one end thereof are each connected with air exhaust means, for example fans 10, FIG. 1, which extract air from the booth through the tubes 4. Each tube 4 is provided with fixed vanes 11 arranged to create in air and water passing through the tube a gyratory turbulence which forms the water into small droplets to which paint entrained in the air adheres. As the mixture leaves the lower end of the tube 4 the water droplets are deposited into the trough 6 and the air is exhausted through the ducts 9 after passing water eliminators 12.

In operation, water is circulated round the water-circulating system by the pump 7, as indicated by arrows 13, FIG. 1, and on leaving the pipes 5 flows down the guide plate 3 into the tubes 4. Air is drawn, as indicated by arrows 14, by the exhausting means 10, from the booth into the tubes 4 and the vanes 11 cause the water and air to be gyrated in a manner such as to create a turbulence as a result of which the air and water are thoroughly mixed and the water is broken up into small droplets to which paint entrained in the air adheres. On leaving the lower ends of the tubes 4 the water droplets fall into the trough 6 and return to pump 7 which pumps the water into and through the water-cleansing means 8 and the cleansed water back into the pipes 5. It will be understood that the water-cleansing means 8 is upstream of the tubes 4 because it is essential that the water be clean when delivered into the tubes 4. On leaving the tubes 4 the air is drawn past the water eliminators 12 into the ducts 9 for discharge.

FIGS. 4 to 6 illustrate a modified embodiment of the apparatus in which the paint spraying booth includes side walls 1, end walls 2, of which only one is shown, and a roof 15, FIG. 5.

Air may be supplied to the booth by apparatus, indicated by the reference numeral 16, as described in British patent specification No. 1,020,591.

As shown in FIG. 5, the guide plate 3 is composed of a plurality of plate-forming elements 3a disposed in edgewise overlapping relation. In this embodiment of the invention the trough 6 communicates via a water-seal 16, FIG. 6, and overflow plate 17 with a flume 18 leading to the water-cleansing means 8.

The water which flows over the guide plate 3 to the tubes 4 is delivered to the guide plate from the pipes 5 which, as shown in FIG. 5, are provided with perforations 5a the outlet ends of which are directed away from the general direction of flow down the guide plate 3. Each pipe 5 is associated with a baffle member 19, FIG. 5, which partly surrounds the pipe and is arranged to guide the water issuing from the pipe around and over the top of the pipe for delivery on to the guide plate 3 in the general direction in which the water flows over the guide plate to the tubes 4.

In operation, water is circulated round the water-circulating system by the pump 7, as indicated by the arrows 13, FIG. 4, and flows over the guide plate 3 into the tubes 4. Air is drawn, as indicated by the arrows 14, by the exhausting means 10, from the booth into the tubes 4 and the vanes 11 cause the water and air to be gyrated in a manner such as to create a turbulence as a result of which the air and water are thoroughly mixed and the water is broken up into small droplets to which paint entrained in the air adheres. The arrangement, in both embodiments of the invention, is such that intimate contact is effected between the water and paint particles in the air and such contact is effected in part by the turbulence created by the gyratory movement of the aid and water, in part by impingement of paint-laden air against the interior sides of the tube and on the surfaces of the vanes 11, which sides and vane are covered by a thin layer of water, and in part by impingement, particularly of paint-laden air which may travel vertically downwards adjacent to the axis of the tube, against the water in the trough 6, it being understood that the greater weight of the paint particles will cause them to impinge against the water in the trough while the air will turn through approximately 90° into the ducts 9. As shown in FIGS. 4 to 6, the paint-laden water in trough 6 passes through the water-seal 16, over the overflow plate 17, thence to flume 18 and the water-cleansing means 8 which includes a filter 20, FIG. 4, and the cleansed water is returned by pump 7 to the pipes 5. On leaving the tubes 4 the air is drawn through the ducts 9 into extract stacks 21, FIG. 4, for discharge. From FIG. 4 it will be observed that the stacks 21 are located within the confines of the apparatus and do not project from the sides of the booth.

If desired, the side walls 1 of the booth can be made of glass or other transparent material and access doors 22, FIG. 4, can be located at any desired positions along the side walls 1.

If the booth is of the kind in which operators work only on one side of the path of the articles through the booth one wall of the booth will be closely adjacent to the tubes 4 and only one duct 9 will be provided.

The tubes 4 have been shown and described as being in line lengthwise of the booth but if desired some of the tubes may be offset from the line.

The vanes 11 are mounted on removable frames, not shown, which rest in the tubes 4 and which can be easily lifted from the tubes for ease of cleaning. By disposing the ducts 9 beneath the guide plate 3 they are located within the confines of the booth and so reduce to a minimum the floor space required for the booth and permit the booth to be provided with access doors 22 at any position along the length of the booth, as mentioned above. Further, the herein described apparatus for washing the air enables a reduced water flow quantity to be used thereby reducing the size of the pumping and water-cleansing equipment.

I claim:

1. Apparatus for removing paint from air in a paint spraying booth comprising a water-circulating system, upright walls providing a work chamber, a grille floor, a guide plate below said floor providing a water-washed subfloor extending lengthwise of and across the booth, a water trough having bottom and side walls extending lengthwise of the booth, upright side walls extending along the length of the water trough on opposite sides thereof, a plurality of upright tubes extending downwardly from the subfloor and between said upright side walls, said trough having a width substantially greater than the diameters of said tubes, means causing water from said circulating system to flow by gravity across the guide plate directly into the upper ends of said tubes and downwardly over the internal surface of the tube into the portion of said water trough located directly below said tubes, exhaust means for causing the paint-laden air from said work chamber to flow through said grille floor downwardly through said tube toward said trough and to be deflected upwardly by the water in said trough, means comprising air-directing vanes mounted in said tube for creating a gyratory turbulence in said tube to form small droplets of water so as to cause the paint entrained in the air to adhere to said droplets and be deposited on the water flowing through said tube and over said vanes and on the body of water in said trough.

2. Apparatus as defined in claim 1 wherein the water-circulating system includes a pipe located above the guide plate and provided with perforations through which water issues to flow over the guide plate, and a baffle member partly surrounding the pipe and arranged to guide water issuing from the pipe around and over the top of the pipe for delivery onto the guide plate in the general direction in which it is to flow over the guide plate to the tube or tubes.

3. Apparatus as defined in claim 1 wherein the guide plate is composed of a plurality of substantially horizontal plate-forming elements disposed in edgewise overlapping relation.

4. Apparatus as defined in claim 1 wherein each tube is axially elongated and has a series of circumferentially spaced spiral vanes mounted therein located to receive water flowing through the tube.

5. Apparatus as defined in claim 4 wherein said trough has a width several times the diameter of each tube and said upright side walls are spaced from the tubes to reverse the direction of flow of the air flowing out of said tubes, said tubes and said trough being located generally central of the width of said guide plate.

6. Apparatus as defined in claim 1 wherein said upright tubes are supported in a row above the bottom of said trough, exhaust ducts are located on opposite sides of said trough and extend lengthwise of the booth to remove air discharged from said tubes, and said upright side walls are provided on opposite sides of said trough to direct the air upwardly at the exterior of the tubes and cause the air to enter said ducts near the upper end of said tubes.

7. Apparatus as defined in claim 6 wherein baffles (12) are provided on said last-named upright walls and on the exterior of the tubes to cause the air to move upwardly in a tortuous path.

References Cited

UNITED STATES PATENTS

| | | | |
|---|---|---|---|
| 1,999,589 | 4/1935 | Frey | 55—238 |
| 2,227,272 | 12/1940 | Peters | 55—456 X |
| 2,292,665 | 8/1942 | Schneible | 55—442 X |
| 2,337,983 | 12/1943 | Fisher | 55—241 X |
| 2,385,077 | 9/1945 | Harker et al. | 55—241 X |
| 2,719,705 | 10/1955 | Watson | 55—248 X |
| 2,788,954 | 4/1957 | Paasche | 55—444 X |
| 2,912,918 | 11/1959 | Mead | 98—115 |
| 3,075,751 | 1/1963 | Najarian | 261—112 |
| 3,119,675 | 1/1964 | Gallagher | 261—112 X |
| 3,123,455 | 3/1964 | Paasche | 55—257 X |
| 3,138,087 | 6/1964 | Larsson et al. | 261—112 X |
| 3,168,030 | 2/1965 | Wilhelmsson et al. | 261—112 X |
| 3,168,031 | 2/1965 | Wilhelmsson et al. | |
| 3,170,384 | 2/1965 | Krantz et al. | 261—112 X |
| 3,182,977 | 5/1965 | Erni | 261—112 |

FOREIGN PATENTS

| | | |
|---|---|---|
| 626,832 | 5/1927 | France. |
| 1,192,088 | 4/1959 | France. |

OTHER REFERENCES

German printed application No. 1,157,977, printed November 1963, Schilde, B.

German printed application No. 1,009,635, printed June 1957, Steinmuller.

HARRY B. THORNTON, Primary Examiner.

DENNIS E. TALBERT, Jr., Assistant Examiner.

U.S. Cl. X.R.

55—237, 228, 239, 240, 248, 257, 442; 98—115; 261—79, 112, 5, 24